Figure 1:
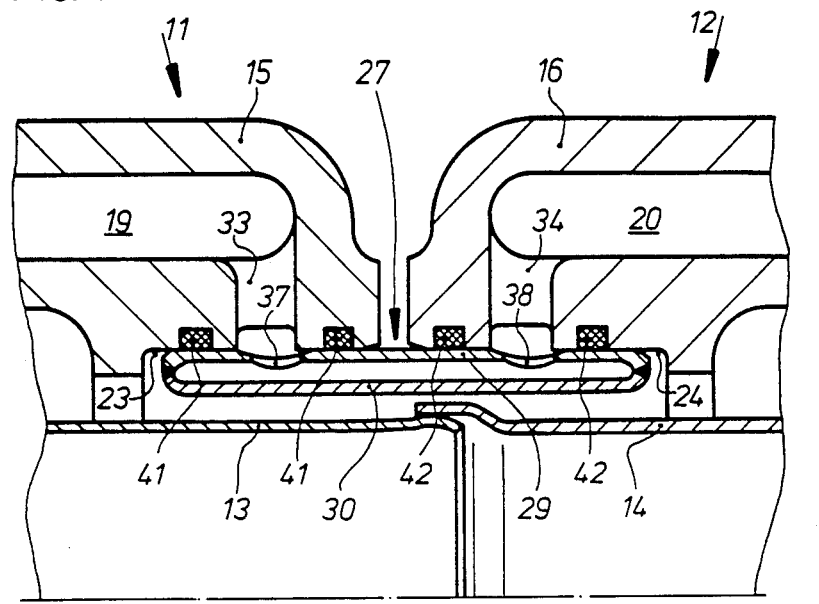

United States Patent [19]

Wuensche et al.

[11] Patent Number: 4,693,079
[45] Date of Patent: Sep. 15, 1987

[54] MULTI-PARTITE EXHAUST GAS LINE

[75] Inventors: Dieter Wuensche, Friedrichshafen; Norbert Eisenblaetter, Langenargen, both of Fed. Rep. of Germany

[73] Assignee: MTU-Motoren und Turbinen-Union Friedrichshafen GmbH, Fed. Rep. of Germany

[21] Appl. No.: 928,019

[22] Filed: Nov. 7, 1986

[30] Foreign Application Priority Data

Nov. 9, 1985 [DE] Fed. Rep. of Germany ....... 3539778

[51] Int. Cl.⁴ ............................................... F01N 3/02
[52] U.S. Cl. ...................................... 60/320; 60/322; 285/41
[58] Field of Search ....................... 60/320, 321, 322; 285/41

[56] References Cited

U.S. PATENT DOCUMENTS

| 1,389,768 | 9/1921 | McFarland | 285/41 |
| 2,910,309 | 10/1959 | Snyder | 285/41 |
| 3,798,904 | 3/1974 | Gleason | 60/320 |
| 4,179,884 | 12/1979 | Koeslin | 60/322 |

FOREIGN PATENT DOCUMENTS 2537924 3/1977 Fed. Rep. of Germany ........ 285/41

Primary Examiner—Douglas Hart
Attorney, Agent, or Firm—Barnes & Thornburg

[57] ABSTRACT

An exhaust gas line for a piston internal combustion engine assembled of several parts consists of an inner pipe line conducting the exhaust gases and of a housing surrounding this pipe line with a spacing. Each of the housings contains a cooling liquid space. The cooling liquid spaces of adjacent housing are connected with each other by a connecting nipple. The connecting nipple, axially displaceable in the recesses, permits an expansion compensation between adjacent housings.

11 Claims, 2 Drawing Figures

MULTI-PARTITE EXHAUST GAS LINE

The present invention relates to a multi-partite exhaust gas line for a piston internal combustion engine in which each exhaust gas line section consists of an inner pipe line conducting therein the exhaust gases and of a housing surrounding this pipe line and including a cooling liquid space, and in which the housings of adjacent exhaust gas line sections are connected with each other. A low surface temperature of the exhaust gas line is to be achieved with such an arrangement.

An exhaust gas line of this type is disclosed in the U.S. Pat. Nos. 2,886,945. The housings of the individual exhaust gas line sections are thereby rigidly connected with each other by screwed-together flange connections. The cooling liquid space of each housing is connected by itself by way of lines with the cooling circulatory system of the piston internal combustion engine.

The missing axial expansion compensation between the housings and the large number of freely exposed pipe line sections and connections for the supply of the housing with cooling liquid is disadvantageous with this prior art arrangement.

It is therefore the object of the present invention to create for an exhaust gas line of the aforementioned type an axial expansion compensation between the adjacent housings and to keep small the number of freely exposed cooling liquid lines and the connections thereof.

The underlying problems are solved according to the present invention in that a cylindrical recess is formed at the adjacent ends of housings of two exhaust gas line sections which cooperates with a connecting nipple, and in that at least one fluid channel is arranged in the walls of the connecting nipple which has radial openings that correspond with corresponding radial openings of the cooling liquid spaces in the cylindrical recesses of the adjacent housings.

The advantages achieved with the present invention reside in particular in that by the elimination of the flange connection between the housings of the exhaust gas line sections a considerable saving in weight and structural space is achieved, in that an economically manufacturable axial expansion compensation between the housings is created by the axial displaceability of the connecting nipple in the cylindrical recesses and in that by the elimination of freely exposed cooling liquid lines and of the threaded connections thereof considerable manufacturing costs are economized.

Figure 2:
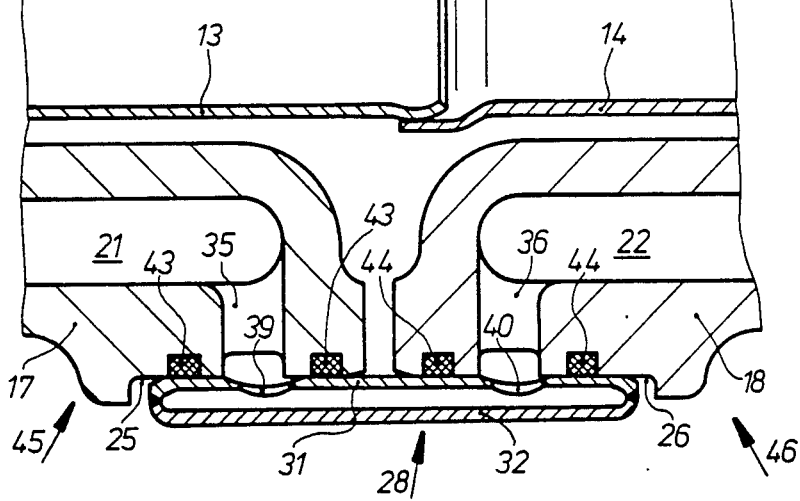

These and other objects, features and advantages of the present invention will become more apparent from the following description when taken in connection with the accompanying drawing which shows, for purposes of illustration only, two embodiments in accordance with the present invention, and wherein:

FIG. 1 is a partial longitudinal cross-sectional view through a multi-partite exhaust gas line in accordance with the present invention with a connecting nipple between two housing ends that is located on the inside; and FIG. 2 is a partial longitudinal cross-sectional view through a modified embodiment of a multi-partite exhaust gas line in accordance with the present invention with a connecting nipple between the two housing ends that is located on the outside.

Referring now to the drawing wherein like reference numerals are used throughout the two views to designate corresponding parts, an exhaust gas line for a piston internal combustion engine consists of several exhaust gas line sections generally designated by reference numerals 11, 12, 45, 46 which consist each of an inner pipe line 13, 14 conducting the exhaust gases and of a housing 15, 16, respectively, 17, 18 surrounding this pipe line 13 and 14 with a spacing. Each of the housings 15, 16, 17, 18 contains cooling liquid spaces 19, 20, respectively, 21, 22 which are connected to the cooling circulation of the piston internal combustion engine. One cylindrical recess 23, 24, respectively, 25, 26 for a connecting nipple generally designated by reference numerals 27, 28 is formed at the adjacent ends of the housings 15, 16, respectively, 17, 18 of the exhaust gas line sections 11, 12, 45, 46.

The cooling liquid spaces 19, 20, 21, 22 of the housings 15, 16, 17, 18 are provided with openings 33, 34, respectively, 35, 36 which terminate in the circumferential surfaces of the cylindrical recess 23, 24, 25, 26.

The connecting nipple 27, 28 consists of an outer and of an inner cylindrical wall 29, 30, respectively, 31, 32 which are connected with each other in a fluid-tight manner at their axial edges and enclose therebetween a ring-shaped hollow space. In the embodiment according to FIG. 1, bores 37, 38 are arranged in the outer cylindrical wall 29 and in the embodiment according to FIG. 2, bores 39 and 40 are arranged in the inner cylindrical wall 31 which in the installed condition of the connecting nipple 27 or 28 communicate with the corresponding openings 33, 34, 35, 36 in the circumferential surface of the cylindrical recesses 23, 24, 25, 26. As a result thereof, the cooling liquid spaces 19, 20, respectively, 21, 22 of the housings 15, 16, respectively, 17, 18 are connected with each other to permit the passage therethrough of liquid.

On both sides adjacent the openings 33, 34, 35, 36, grooves are machined into the circumferential surface of each cylindrical recess 23, 24, 25, 26 for the installation of sealing rings 41, 42, 43, 44 so that cooling water leakages into the interior of the exhaust gas line or toward the outside are sealed off.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A multi-partite exhaust gas line for a piston internal combustion engine in which each exhaust gas line section includes an inner pipe line means conducting the exhaust gases and a housing means surrounding said pipe line means with a spacing and having a cooling liquid space, the housing means of adjacent exhaust gas line sections being connected with each other, a substantially cylindrical recess means being formed in the adjacent ends of the housing means of two exhaust gas line sections, said recess means cooperating with a connecting nipple means, at least one liquid channel being arranged within the walls of the connecting nipple means that has radial openings, said radial openings corresponding with corresponding radial openings of the cooling liquid spaces in the cylindrical recess means of adjacent housing means.

2. An exhaust gas line according to claim 1, wherein the connecting nipple means cooperates at its outer diameter with the cylindrical recess means.

3. An exhaust gas line according to claim 1, wherein the connecting nipple means cooperates at its inner diameter with the cylindrical recess means.

4. An exhaust gas line according to claim 1, further comprising sealing ring means arranged axially adjacent on both sides of the respective corresponding openings of the cylindrical recess means and connecting nipple means.

5. An exhaust gas line according to claim 1, wherein the connecting nipple means includes an outer and an inner substantially cylindrical wall which enclose therebetween a ring-shaped hollow space.

6. An exhaust gas line according to claim 5, wherein the outer and the inner cylindrical walls are connected with each other fluid-tight along their axial edges.

7. An exhaust gas line according to claim 4, wherein the connecting nipple means cooperates at its outer diameter with the cylindrical recess means.

8. An exhaust gas line according to claim 4, wherein the connecting nipple means cooperates at its inner diameter with the cylindrical recess means.

9. An exhaust gas line according to claim 5, further comprising sealing ring means arranged axially adjacent on both sides of the respective corresponding openings of the cylindrical recess means and connecting nipple means.

10. An exhaust gas line according to claim 9, wherein the outer and the inner cylindrical walls are connected with each other fluid-tight along their axial edges.

11. An exhaust gas line according to claim 10, wherein the connecting nipple means cooperates at its outer diameter with the cylindrical recess means.

* * * * *